Aug. 18, 1936.     C. H. BLOEDORN     2,051,676
METHOD FOR TREATING OYSTERS PREPARATORY TO CANNING THE SAME
Filed Jan. 18, 1935
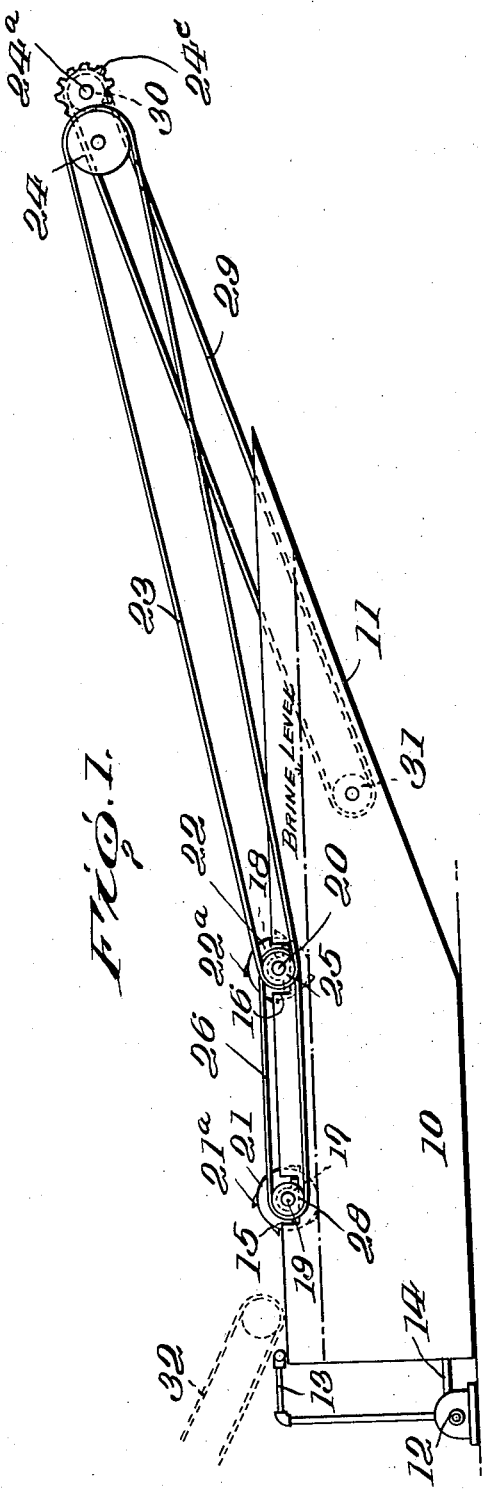
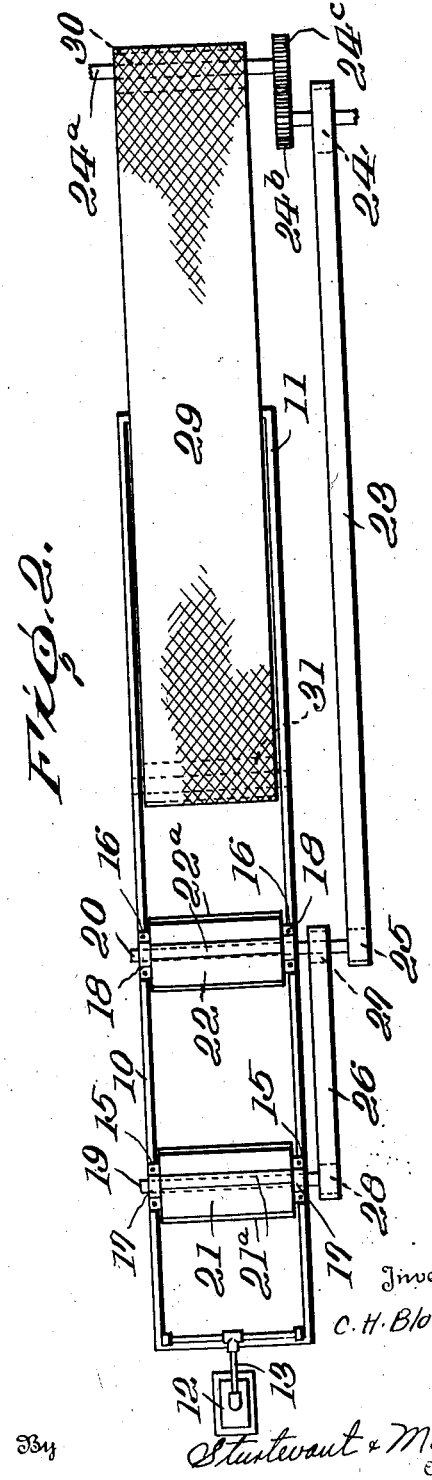
Inventor
C. H. Bloedorn
By Sturtevant & Mason
Attorneys Patented Aug. 18, 1936

2,051,676

UNITED STATES PATENT OFFICE 2,051,676

METHOD FOR TREATING OYSTERS PREPARATORY TO CANNING THE SAME

Clyde H. Bloedorn, New Orleans, La., assignor to Continental Can Company, Inc., New York, N. Y., a corporation of New York Application January 18, 1935, Serial No. 2,423

2 Claims. (Cl. 209—173)

The present invention relates to the treatment of sea food, and more particularly to the treatment of oysters preparatory to canning the same.

An object of the present invention is to provide an improved method of treating oysters whereby to remove any particles of shell, sand or grit preparatory to the canning thereof.

A further object of the invention is to provide an improved method of treating oysters whereby to impart a salt flavor thereto preparatory to the canning thereof.

The above and other objects of the invention will in part be obvious and will be hereinafter more fully pointed out.

In the accompanying drawing:

Figure 1 is a side elevation showing one form of apparatus for carrying out the present method, and Fig. 2 is a top plan view of the same.

The invention relates generally to the treatment of oysters preparatory to the canning thereof, and contemplates the passage of the oysters, after they have been taken from their shells, through a salt bath of sufficient saturation to buoy up the oysters therein. The salt bath is of insufficient saturation to buoy up particles of shell, sand or grit so that these particles will fall to the bottom of the bath as the oysters are mildly agitated during their passage therethrough in order to dislodge any such particles of shell, sand or grit. In this manner the oysters are effectively cleaned before canning. The salt bath is preferably of relatively high saturation so as to impart a salt flavor to the oysters as they are passed through the solution. This obviates the necessity of adding an additional amount of salt to the canning brine.

In the accompanying drawing, one form of an apparatus for carrying out the method is shown for purposes of illustration. A receptacle in the form of a tank 10 having an upwardly inclined end 11 is adapted to contain a bath of a salt solution. A circulating pump 12 is utilized for circulating the solution in the tank, the solution being drawn from the tank through a pipe 14 and being delivered to the tank through a pipe 13. The tank 10 is provided with pairs of notches 15, 16 in the sides thereof. Bearing brackets 17, 18 are mounted in the notches 15, 16, respectively, and are adapted to support the shafts 19, 20 of two propelling devices 21, 22 respectively, which are in the form of cylinders having fins 21a, 22a, protruding from the respective peripheries thereof. The propelling cylinders are mounted so that a portion of each remains under the surface of the salt solution, as shown in Fig. 1 of the drawing, where the surface of the solution is indicated by a broken line. The propelling cylinder 22 is rotated by a belt 23 which extends from a driving pulley 24 to a pulley 25 on the shaft 20. The pulley 24 is driven through intermeshing gears 24b, 24c, from a driving shaft 24a. The propelling cylinder 21 is driven by a belt 26 extending from a pulley 27 on the shaft 20 to a pulley 28 on the shaft 19. A wire mesh conveyor 29 driven by a pulley 30 on the shaft 24a and extending over a pulley 31 mounted in the sides of the tank 10 beneath the surface of the salt bath is adapted to remove the oysters from the bath at the completion of the treatment thereof. A conveyor 32 is adapted to deliver the oysters from a preliminary washer to the salt bath in the tank 10.

The oysters are delivered from a flume washer, after they have been taken from their shells, to the salt bath in the tank 10 by the conveyor 32. The salt solution is of at least sufficient saturation to buoy up the oysters and prevent them from descending to the bottom of the tank, but the solution is of insufficient saturation to buoy up particles of shell, sand or grit so that such particles of shell, sand or grit will be permitted to descend to the bottom of the tank. Preferably the salt solution is of sufficient saturation to float the oysters and to impart a salt flavor thereto by impregnation as they are passed through the bath in the tank so that no additional salt need be added to the relatively weak canning brine. A salt solution having a salometer reading of 35 is sufficient to float the oysters, but there is preferably used, as stated above, a salt solution having a higher salometer reading so as to impart a salt flavor to the oysters. As an example, a salt solution having a salometer reading of 92 has been found to be satisfactory, and at the completion of an experimental run of 175 pounds of oysters through seventeen gallons of the salt solution, it was found that the solution had a salometer reading of 70.

The pump 12 serves to circulate the solution through the tank 10 and this results in the carrying of the oysters from the receiving end of the tank, that is, near the conveyor 32, to the delivery end of the tank, that is, to the inclined portion 11 of the tank so that the conveyor 29 can remove the oysters therefrom. The propelling cylinders 21, 22 aid in moving the oysters through the tank and also serve to intermittently immerse the oysters in the solution. This serves to mildly agitate the oysters in order to dislodge any particles of shell, sand or grit which will then fall to the bottom of the tank. It also serves to subject the entire surface of the oysters to the treatment of the salt solution. As the oysters reach the delivery end of the tank 10, they are carried away by the conveyor 29 to the canning machinery.

From the foregoing description, it will be apparent that a highly efficient and inexpensive method is herewith provided for cleaning and treating oysters prior to the canning thereof. It is to be noted that the time of passage of the oysters through the tank may be changed by regulating the speed of the pump 12 and hence the speed of circulation of the solution. The speed of travel of the oysters through the solution and the saturation of the solution may be changed to vary the amount of impregnation of the oysters by the salt.

Of course, minor changes in the carrying out of the method and in the construction of the apparatus may be made without departing from the scope of the invention as set forth in the appended claims.

Having thus described the invention, what I claim as new and desire to secure by Letters Patent, is—

1. The method of treating oysters preparatory to canning the same consisting in delivering the oysters to a salt bath of sufficient saturation to float the oysters and of insufficient saturation to float particles of shell, sand or grit, moving the oysters through the bath, intermittently and gently submerging the oysters during their movement through the bath whereby to dislodge particles of shell, sand or grit and cause the same to fall to the bottom of the bath, and then removing the oysters from the bath for canning.

2. The method of treating oysters preparatory to canning the same consisting in delivering the oysters to a salt bath of sufficient saturation to float the oysters but of insufficient saturation to float particles of shell, sand or grit, circulating the bath containing the oysters whereby to move the oysters therethrough, intermittently and gently submerging the oysters in the bath whereby to dislodge particles of shell, sand or grit which will fall to the bottom, and thereafter removing the oysters from the bath for canning.

CLYDE H. BLOEDORN.